United States Patent
Kwon

(10) Patent No.: US 7,899,460 B2
(45) Date of Patent: Mar. 1, 2011

(54) METHOD OF DETERMINING CHANNEL TO BE USED IN WIRELESS NETWORK, WIRELESS COMMUNICATION METHOD, AND APPARATUS FOR THE SAME

(75) Inventor: Chang-yeul Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 782 days.

(21) Appl. No.: 11/783,179

(22) Filed: Apr. 6, 2007

(65) Prior Publication Data

US 2008/0051097 A1 Feb. 28, 2008

Related U.S. Application Data

(60) Provisional application No. 60/830,701, filed on Jul. 14, 2006.

(30) Foreign Application Priority Data

Sep. 18, 2006 (KR) .................. 10-2006-0090272

(51) Int. Cl.
*H04W 72/00* (2009.01)
*H04W 4/00* (2009.01)
*H04B 7/00* (2006.01)

(52) U.S. Cl. .................. 455/450; 455/434; 455/464; 455/509; 370/328; 370/329

(58) Field of Classification Search ............... 455/41.2, 455/62, 418, 422.1, 425, 427, 431, 432.1–432.3, 455/433–434, 435.1–435.3, 436–444, 447–451, 455/452.1–452.2, 454–455, 456.1–456.3, 455/456.5–456.6, 509, 512–514, 524–525, 455/550.1, 552.1, 553.1, 556.2, 560–561, 455/67.11, 103, 464, 515, 517; 370/310, 370/328–334, 338, 341, 437, 458; 348/12.01, 348/14.02, 38

See application file for complete search history.

(56) References Cited

U.S. PATENT DOCUMENTS

| | | | |
|---|---|---|---|
| 6,529,738 B1 * | 3/2003 | Forde et al. | 455/514 |
| 6,553,229 B1 * | 4/2003 | Dent | 455/434 |
| 7,406,062 B2 * | 7/2008 | Hsu | 370/329 |
| 7,577,450 B2 * | 8/2009 | Miyazaki | 455/464 |
| 2004/0253996 A1 * | 12/2004 | Chen et al. | 455/574 |
| 2006/0002488 A1 * | 1/2006 | Asanuma | 375/268 |
| 2006/0159003 A1 * | 7/2006 | Nanda et al. | 370/203 |
| 2006/0203946 A1 * | 9/2006 | Moch et al. | 375/349 |

* cited by examiner

*Primary Examiner* — Meless N Zewdu
(74) *Attorney, Agent, or Firm* — Sughrue Mion, PLLC

(57) ABSTRACT

There is provided a wireless communication method, the method including selecting first and second channels that apply different data transmission capabilities, respectively, and transmitting and receiving data using the selected first and second channels.

31 Claims, 11 Drawing Sheets

WIRELESS NETWORK (100)

FIG. 7

| HRP CHANNEL | LRP CHANNEL | ENERGY DETECTION RESULT VALUE | FIRST THRESHOLD VALUE |
|---|---|---|---|
| 1 | 1A | 0 | 10 |
| | 1B | 2 | |
| | 1C | 1 | |
| 2 | 2A | 8 | |
| | 2B | 12 | |
| | 2C | 4 | |
| 3 | 3A | 14 | |
| | 3B | 10 | |
| | 3C | 18 | |
| 4 | 4A | 5 | |
| | 4B | 8 | |
| | 4C | 3 | |

710

720

METHOD OF DETERMINING CHANNEL TO BE USED IN WIRELESS NETWORK, WIRELESS COMMUNICATION METHOD, AND APPARATUS FOR THE SAME

CROSS REFERENCE TO RELATED APPLICATION

This application claims priority from Korean Patent Application No. 10-2006-0090272 filed on Sep. 18, 2006 in the Korean Intellectual Property Office, and U.S. Provisional Patent Application No. 60/830,701 filed on Jul. 14, 2006 in the United States Patent and Trademark Office, the disclosures of which are incorporated herein by reference in their entirety.

BACKGROUND OF THE INVENTION

1. Field of the Invention

Methods and apparatuses consistent with the present invention relate to wireless communication, and more particularly, to a technology for determining channels to be used in a wireless network.

2. Description of the Related Art

In recent years, as a wireless network becomes more common, transmission of a large capacity of multimedia data has been increasingly required. As a result, research on an effective data transmission method in a wireless network environment has been required. Further, wireless transmission of high quality video, such as DVD (Digital Video Disk) video, HDTV (High Definition Television) video, and the like, among various home appliances has been increasingly required.

One task group of IEEE 802.15.3c is trying to promote a technology standard for transmitting a large capacity of data by a wireless home network. In this technology standard that is referred to as a so-called mmWave (Millimeter Wave), in order to transmit a large capacity of data, a wave (that is, electric wave having a frequency in a range of 30 to 300 GHz) is used in which a physical wavelength is represented in millimeters. In general, this frequency band has been limited for use in communication operators, electric wave astronomical observations, or vehicle collision prevention.

In an IEEE 802.11b specification or an IEEE 802.11g specification, a carrier wave frequency is 2.4 GHz, and a channel bandwidth is approximately 20 MHz. Further, in an IEEE 802.11a specification or an IEEE 802.11n specification, a carrier wave frequency is 5 GHz, and a channel bandwidth is approximately 20 MHz. Meanwhile, the mmWave uses a carrier wave frequency of 60 GHz, and has a channel bandwidth in a range of approximately 0.5 to 2.5 GHz. Accordingly, it may be understood that the mmWave has a larger carrier wave frequency and channel bandwidth than the standard that exist in the IEEE 802.11 series. As such, when using a high frequency signal (mmWave) having a wavelength measured as a unit of millimeter, a very high transmission rate measured as a unit of several Gbps may be achieved. Further, a size of an antenna may be reduced to 1.5 mm or less and thus it is possible to implement a single chip including the antenna.

In recent times, research has been made for transmitting uncompressed audio or video data (hereinafter, simply referred to as uncompressed AV data) using a high bandwidth of the mmWave. The AV data is lossy compressed by a method of removing portions that are not sensitive to the human, visual and auditory senses by motion compensation, a DCT conversion, quantization, variable length coding, and the like. Accordingly, there are disadvantages in the compressed AV data in that image quality deterioration may occur in the compressed AV data due to the compression loss, and AV data compression and restoring processes between a transmitting device and a receiving device should be based on the same standard. Meanwhile, there are advantages in the uncompressed AV data in that the uncompressed AV data includes digital values (for example, R, C, and B components) indicating pixel components, and thus may provide a high definition image quality.

However, data, such as a beacon, an ACK packet, a MAC command packet, and the like, which has a small amount of information, is transmitted through a channel using a wide bandwidth, which causes wireless resources to be wasted. Therefore, it is necessary to use a channel (low-rate channel) having a narrow bandwidth for transmitting data having a small amount of information and a channel (high-rate channel) having a wide bandwidth for transmitting data having a large amount of information for one wireless network. In this case, a technology is required for appropriately selecting the low-rate channel and the high-rate channel.

SUMMARY OF THE INVENTION

An aspect of the invention is to effectively scan and select a plurality of channels whose applicable transmission capabilities are different from one another.

Another aspect of the invention is to provide a wireless network in which both a high speed channel and a low speed channel are used.

Aspects of the invention are not limited to the above-mentioned aspects, and other aspects of the invention will be apparently understood by those skilled in the art through the following description.

According to an aspect of the present invention, there is provided a wireless communication method, the method including selecting first and second channels that apply different data transmission capabilities, respectively, and transmitting and receiving data using the selected first and second channels.

According to an aspect of the present invention, there is provided a method of determining a channel to be used in a wireless network, the method including scanning a plurality of channels, and selecting a plurality of channels that apply different data transmission capabilities according to the scanning result.

According to an aspect of the present invention, there is provided a wireless communication apparatus, the apparatus including a transceiver scanning a plurality of channels, and a MAC processing unit selecting a plurality of channels that apply different data transmission capabilities according to the scanning result.

BRIEF DESCRIPTION OF THE DRAWINGS

The above and other features and advantages of the invention will become more apparent by describing in detail exemplary embodiments thereof with reference to the attached drawings in which:

FIG. 7 is a diagram illustrating an energy detecting value for each channel according to an exemplary embodiment of the invention;

DETAILED DESCRIPTION OF EXEMPLARY EMBODIMENTS OF THE INVENTION

Figure 1:
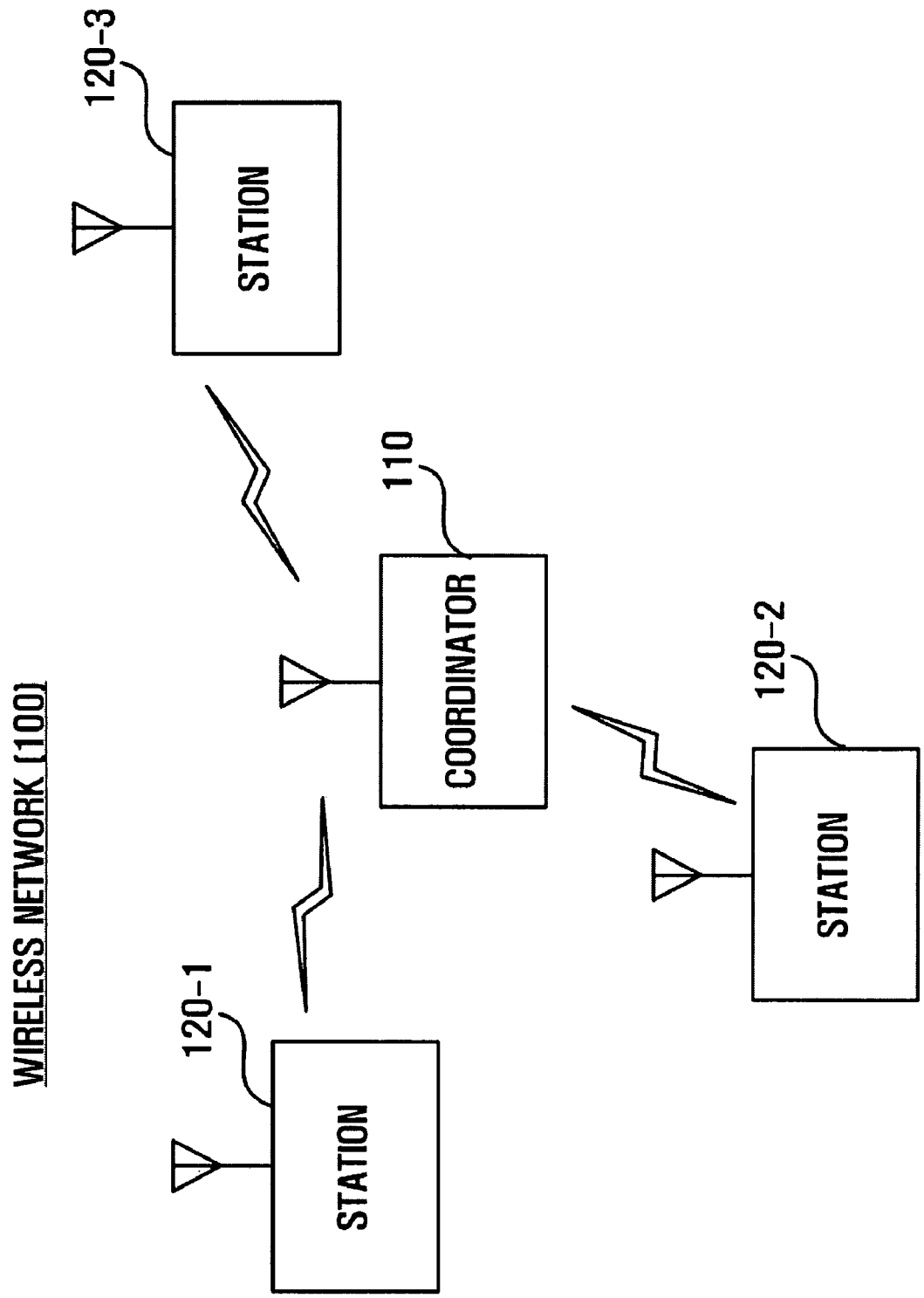
FIG. 1 is a diagram illustrating a wireless network according to an exemplary embodiment of the invention.

Advantages and features of the invention and methods of accomplishing the same may be understood more readily by reference to the following detailed description of exemplary embodiments and the accompanying drawings. The invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the invention will only be defined by the appended claims. Like reference numerals refer to like elements throughout the specification.

Hereinafter, the invention will now be described more fully with reference to the accompanying drawings, in which exemplary embodiments of the invention are shown.

FIG. 1 is a diagram illustrating a wireless network 100 according to an exemplary embodiment of the invention. Preferably, the wireless network 100 is a WVAN (Wireless Video Area Network) that may apply various applications for high speed transmission of A/V (Audio/Video). The A/V data that is transmitted through the WVAN may be in a compressed state or an uncompressed state. For example, the A/V data may be uncompressed 1080p A/V data, uncompressed 1080i A/V data, 1080p A/V data compressed in a format of MPEG2, uncompressed 5.1 surround sound audio, and the like.

The wireless network 100 shown in FIG. 1 includes a coordinator 110, and stations 120-1, 120-2, and 120-3 (hereinafter, referred to as "120"), that is, devices of two types. Of them, the coordinator 110 may be a LCD (Liquid Crystal Display), a flat plate display using plasma, DLP (Digital Lightening Processing), and the like, a sink device, such as a BD (Blue-ray disc) recorder, an HD-DVD (High Definition Digital Versatile Disc) recorder, and a PVR (Personal Video Recorder). The station 120 may be a source device, such as a settop box, a BD player, a BD recorder, an HD-DVD player, an HD-DVD recorder, a PVR, an HD broadcasting receiver, and the like. However, the invention is not limited thereto, and the coordinator 110 and the station 120 may be implemented by devices of other types. Further, the coordinator 110 may be a source device or the station 120 may be a sink device.

In the wireless network 100, the number of stations 120 is not limited. Accordingly, in the wireless network 100, one or more stations 120 may exist or the station may not exist. The station 120 may function as the coordinator 110 according to its capability. A device having capability that can function as the coordinator 110 is referred to as a coordinator capable device.

The coordinator 110 adjusts a communication timing in the wireless network 100, and the station 120 performs communication according to the communication timing that is adjusted by the coordinator 110. The coordinator 110 may broadcast a beacon that contains communication timing information, and the station 120 may know the communication timing by receiving the beacon.

Figure 2:
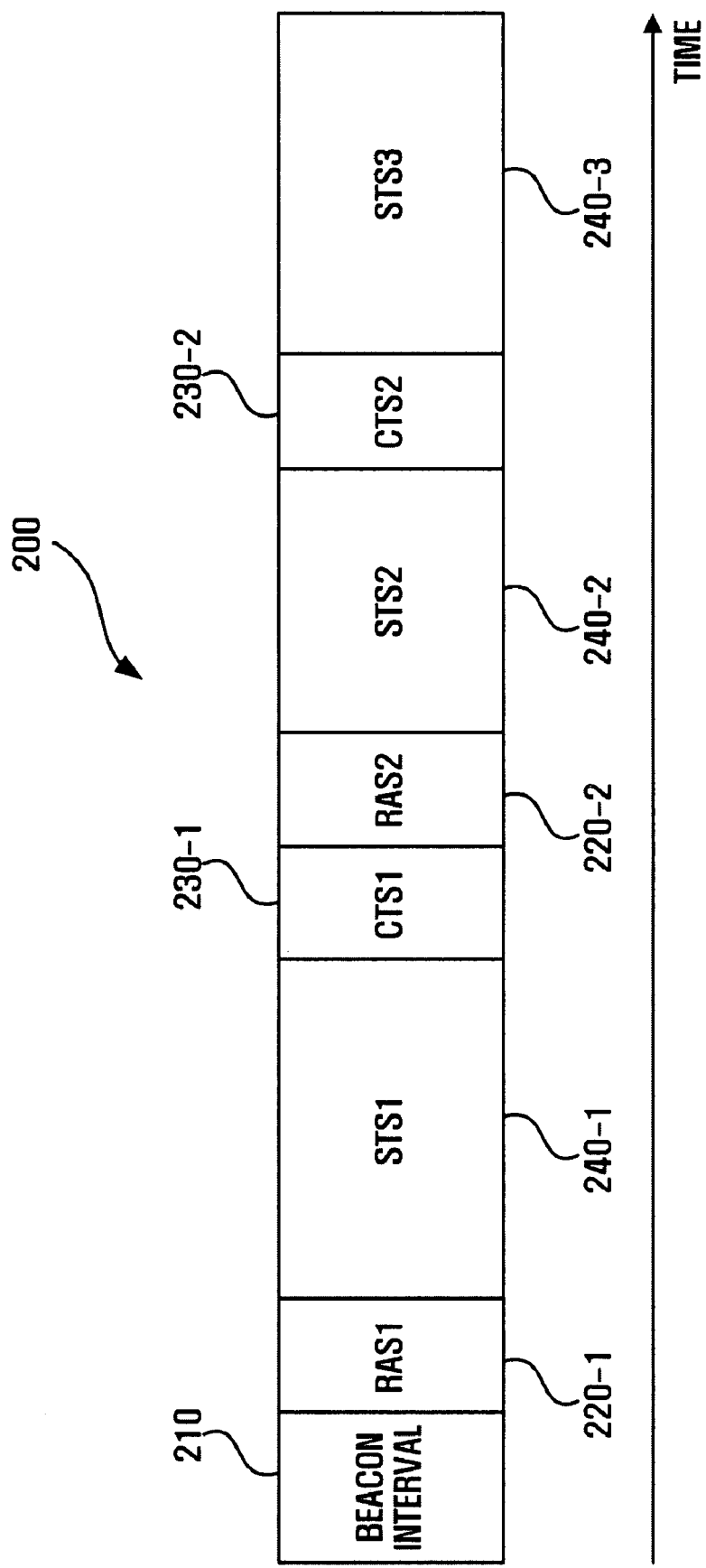
FIG. 2 is a diagram illustrating a super frame according to an exemplary embodiment of the invention.

FIG. 2 shows an example of the communication timing that is controlled by the coordinator. The communication timing is also called a super frame. The super frame 200 includes a beacon interval 210, random access slots (RAS) 220-1 and 220-2 (which are hereinafter referred to as "220", control time slots (CTS) 230-1 and 230-2 (which are hereinafter referred to as "230", and stream time slots (STS) 240-1, 240-2, and 240-3 (which are hereinafter referred to as "240").

The beacon interval 210 refers to a time for which the coordinator transmits the beacon.

The RAS 220 refers to a time that is required when a station, to which a communication time between the corresponding station and the coordinator or another station is not allocated, transmits, to the coordinator, a command indicating that a communication time is allocated to the corresponding station.

The CTS 230 refers to a time that is required when certain control information is transmitted among the stations and between the stations and the coordinator.

The STS 240 refers to a time that is required when data is transmitted. For example, when the source device transmits uncompressed A/V data to the sink device, the STS 240 is used. The data to be transmitted at the STS 240 may be isochronous data and asynchronous data.

In the super frame 200, the number, length, and location of each of the RAS 220, CTS 230, and STS 240 may be determined by the coordinator through the beacon. A beacon transmission interval corresponds to a super frame interval (length of the super frame), and the super frame 200 may be repeated per certain period.

The devices 110 and 120 of the wireless network 100 may apply physical layers (PHYs) of two types, that is, a high-rate PHY (HRP) and a low-rate PHY (LRP). In the wireless network 100, a device that only applies the LRP according to the physical capability may exist.

The HRP may be used to achieve high speed transmission of data (for example, uncompressed A/V data). Preferably, the HRP may apply the output of several (Gigabits per second (Gbps). The HRP may use an adaptive antenna technology to adjust an output direction or a receiving direction of a wireless signal. In this case, the wireless signal that is output from the HRP has directivity. Accordingly, the HRP may be used for unicast. Since the high speed transmission may be made at the HRP, the HRP is preferably used in transmitting isochronous data, such as uncompressed A/V data. That is, in the super frame 200 shown in FIG. 2, the HRP may be used in transmitting and receiving data at the STS 240. However, the invention is not limited thereto. For example, the HRP may be used in transmitting asynchronous data, a MAC (Medium Access Control) command, antenna steering information, and control data of upper layers for A/V devices.

The LRP may be used for high speed transmission. For example, the LRP provides a bidirectional link of several Mega bits per second (Mbps). The wireless signal from the LRP is similar to an omni-directional signal, and thus it may be used for not only unicast but also broadcast. The LRP may transmit low-rate isochronous data like audio, low-rate asynchronous data, an MAC command including a beacon, an acknowledgement for an HRP packet, antenna steering information, capability information, and upper layer control data for an A/V device. That is, the LRP may be used in transmitting and receiving certain information in the beacon interval 210, the RAS 220, or the CTS 230 of the super frame 200. However, the invention is not limited thereto, and the HRP may be used instead of the LRP and the LRP may be used in the STS 240.

Preferably, a communication channel that is used by the HRP has a bandwidth wider than a communication channel that is used by the LRP (hereinafter, simply referred to as LRP channel). The number of each of the HRP and LRP channels that may be applied by the device may be plural. Each of the HRP channels may correspond to at least one LRP channel. Preferably, the frequency band of the LRP channel that corresponds to the HRP channel is included in the frequency band of the HRP channel.

Figure 3:
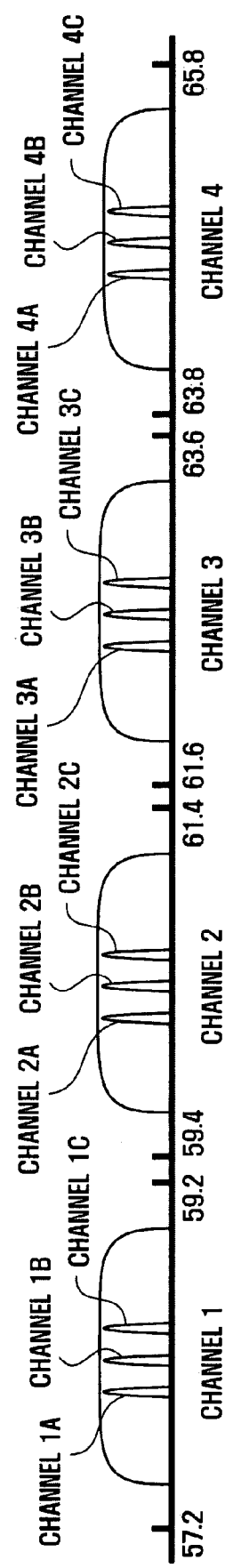
FIG. 3 is a diagram illustrating frequency bands of an HRP channel and an LRP channel according to an exemplary embodiment of the invention.

FIG. 3 is a diagram illustrating the frequency bands of the HRP channel and the LRP channel according to an exemplary embodiment of the invention. Four HRP channels (channels 1 to 4) exist in the frequency band shown in FIG. 3, and three LRP channels (a channel 1A-1C, a channel 2A-2C, a channel 3A-3C, and a channel 4A-4C). The HRP channel has a bandwidth of about 2 GHz, and a central frequency may exist in a range of several GHz to 60 GHz. An exemplary embodiment of a specific frequency band of the HRP channel that is shown in FIG. 3 is shown in Table 1.

TABLE 1

| HRP channel index | Starting frequency | Central frequency | Stop frequency |
| --- | --- | --- | --- |
| 1 | 57.608 GHz | 58.608 GHz | 59.608 GHz |
| 2 | 59.720 GHz | 60.720 GHz | 61.720 GHz |
| 3 | 61.832 GHz | 62.832 GHz | 63.832 GHz |
| 4 | 63.944 GHz | 64.944 GHz | 65.944 GHz |

In Table 1, each HRP channel has a bandwidth of 2 GHz. Meanwhile, an exemplary embodiment of a specific frequency band of the LRP channel that corresponds to each HRP channel is shown in Table 2.

TABLE 2

| LRP channel index | Starting frequency | Central frequency | Stop frequency |
| --- | --- | --- | --- |
| 1 | $f_{c(HRP)} - 203$ GHz | $f_{c(HRP)} - 156.75$ MHz | $f_{c(HRP)} - 110.5$ GHz |
| 2 | $f_{c(HRP)} - 46.25$ MHz | $f_{c(HRP)}$ GHz | $f_{c(HRP)} + 46.25$ GHz |
| 3 | $f_{c(HRP)} + 110.5$ MHz | $f_{c(HRP)} + 156.75$ MHz | $f_{c(HRP)} + 203$ MHz |

In Table 2, $f_{c(HRP)}$ indicates a central frequency of a corresponding HRP channel, and each LRP channel has a bandwidth of 92.5 MHz. The frequency bands shown in Tables 1 and 2 are exemplary, and the invention is not limited thereto. Accordingly, each of the HRP and the LRP may use a different central frequency and a different bandwidth.

As described above, the HRP and the LRP may operate in an overlapping frequency band, and in this case, the used channels may be adjusted by MAC using a method of TDMA (Time Division Multiple Access). Meanwhile, in FIG. 3, and Tables 1 and 2, the four HRP channels, and three LRP channels corresponding to each HRP channel (a total of twelve LRP channels) are shown. However, this is only exemplary, and the number of HRP channels that is applicable by a device, and the number of LRP channels corresponding to each HRP channel may be changed.

The wireless network according to an exemplary embodiment of the invention is driven when the coordinator broadcasts the beacon, and both the HRP channel and the LRP channel are used in one wireless network. Therefore, a device (coordinator capable device) that constructs a new wireless network should determine the HRP channel and the LRP channel to be used in the wireless network.

Figure 4:
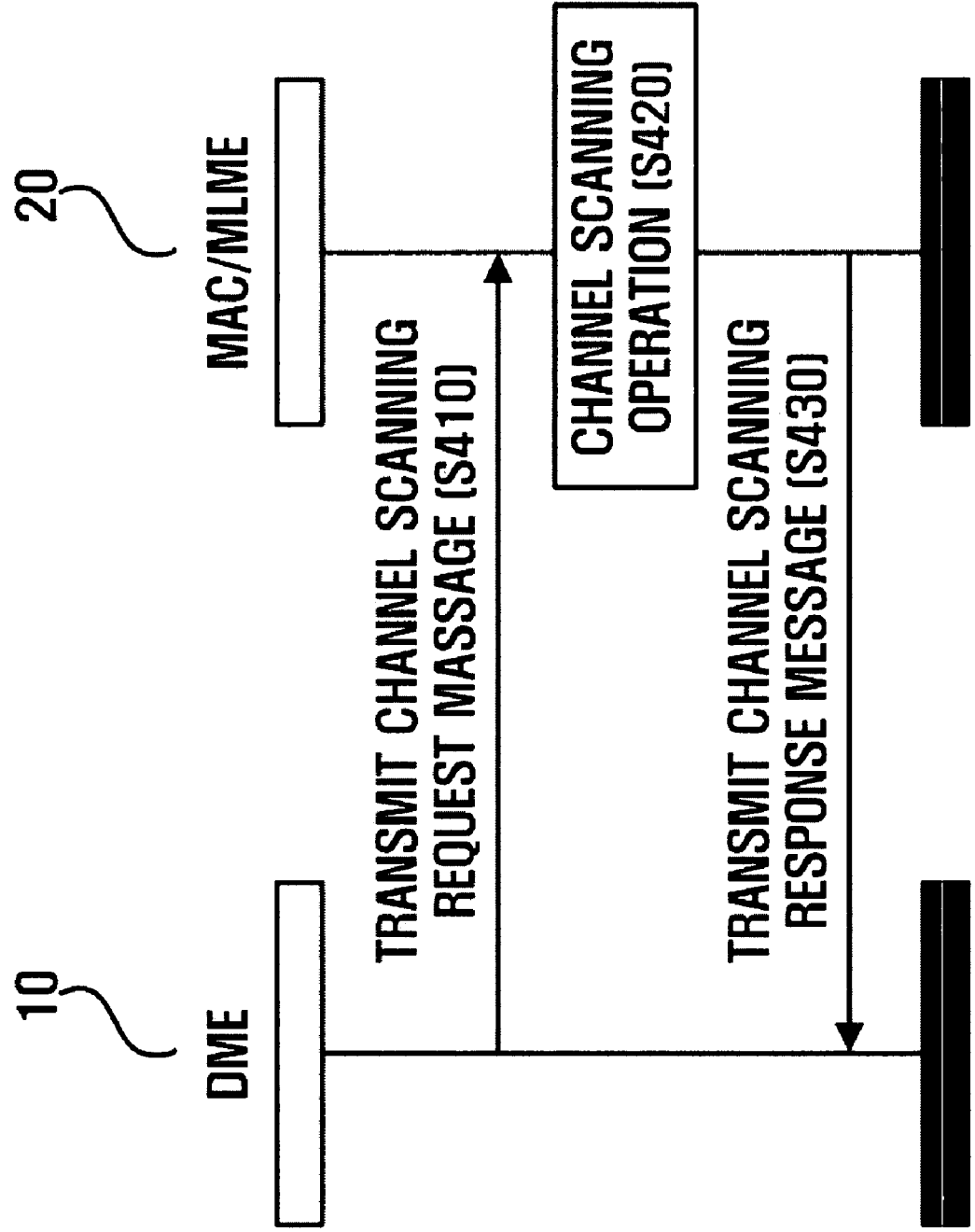
FIG. 4 is a diagram illustrating a message sequence for channel scanning and selecting according to an exemplary embodiment of the invention.

FIG. 4 is a diagram illustrating a message sequence for scanning and selecting a channel according to an exemplary embodiment of the invention. The process shown in FIG. 4 is performed by the coordinator capable device. FIG. 4 shows an operation process between a DME 10 (Device Management Entity), and a MAC 20 (Medium Access Control)/MLME(MAC Sublayer Management Entity). Each of the DME 10 and the MAC/MLME 20 is a layer structure that is included in the coordinator capable device that performs channel scanning.

First, the DME 10 of the coordinator capable device that performs channel scanning transmits a channel scanning request message MEME-SCAN.req to the MAC/MLME 20 (STEP S410).

The MLME 20 that receives the channel scanning request message from the DME 10 performs a channel scanning operation (S420). In the channel scanning process, the MLME 20 selects a pair of the HRP channel and the LRP channel. The HRP channel and the LRP channel that have been selected correspond to channels in which an interference is smallest among a plurality of HRP channels and a plurality of LRP channels, and whose interference values are smaller than threshold values that are set in advance. The channel scanning operation may be mainly divided into an LRP channel scanning process, an HRP channel scanning process, and a channel selecting process, which will be described below with reference to FIGS. 5 to 7.

If the channel scanning operation is completed, the MLME 20 transmits the channel scanning response message to the DME 10 (S430). The channel scanning response message includes information indicating whether channel scanning succeeds. That the channel scanning succeeds means that a channel pair having the HRP channel and the LRP channel for driving a new wireless network is determined. Accordingly, if the channel scanning succeeds, the coordinator capable device may drive a new wireless network.

Figure 5:
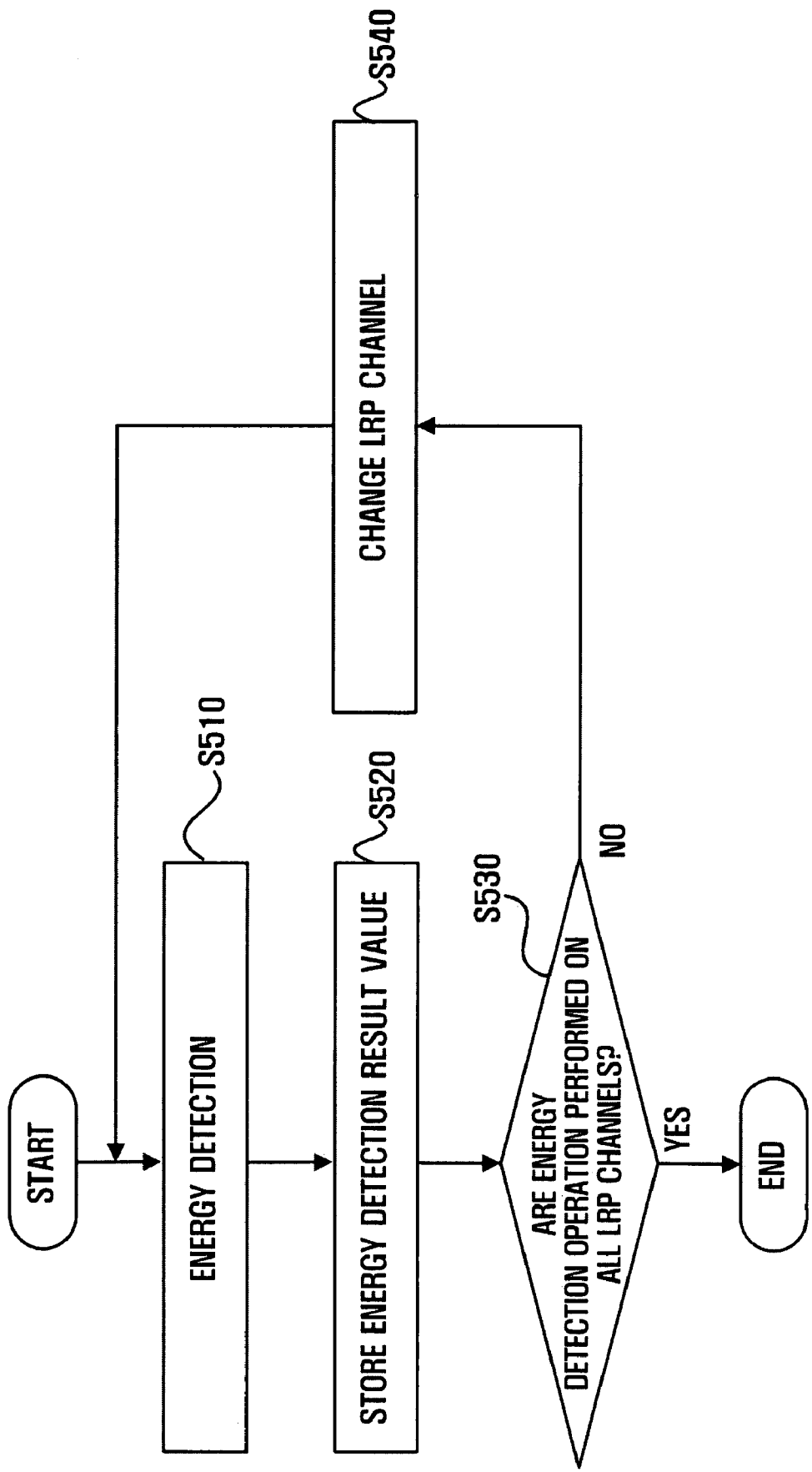
FIG. 5 is a flowchart illustrating a process of scanning an LRP channel according to an exemplary embodiment of the invention.

FIG. 5 is a flowchart illustrating a process of scanning an LRP channel according to an exemplary embodiment of the invention.

The coordinator capable device performs an energy detecting operation on one LRP channel among all of the LRP channels that are applicable by the coordinator capable device (S510). In this invention, the energy is a concept that corresponds to sensitivity of a wireless signal in a specific channel, and means that the larger an energy detection result value is, the higher the sensitivity of the wireless signal in the corresponding channel is. Accordingly, if the energy detection result value is larger, the corresponding channel is used, which causes a communication interference with another wireless network. In contrast, if the energy detection result value is smaller, the corresponding channel is used, which rarely causes a communication interference with another wireless network.

The energy detecting operation may be performed for a first threshold time, and the first threshold time may be set in advance to a time suitable for energy detection with respect to the LRP channel. In this case, it is preferable that the first threshold time be longer than a period of a super frame. This is because if the LRP channel to be currently scanned is used in another peripheral wireless network, the coordinator of another wireless network transmits the beacon to a corresponding LRP channel within a super frame period.

When the energy detecting operation is completed in one LRP channel, the coordinator capable device stores a largest energy detection result value in the corresponding LRP channel (STEP S520).

Then, the coordinator capable device determines whether an energy detection operation is performed with respect to all of the LRP channels applicable by the coordinator capable device (STEP S530). If it is determined that the energy detecting operation is performed with respect to all of the LRP channels, the LRP channel scanning process is completed. However, if there exist the LRP channels on which the energy detecting operation is not performed, the coordinator capable device changes LRP channels to perform an energy detecting operation (STEP S540), and then performs an energy detecting operation on the changed LRP channels (STEP S510).

Figure 6:
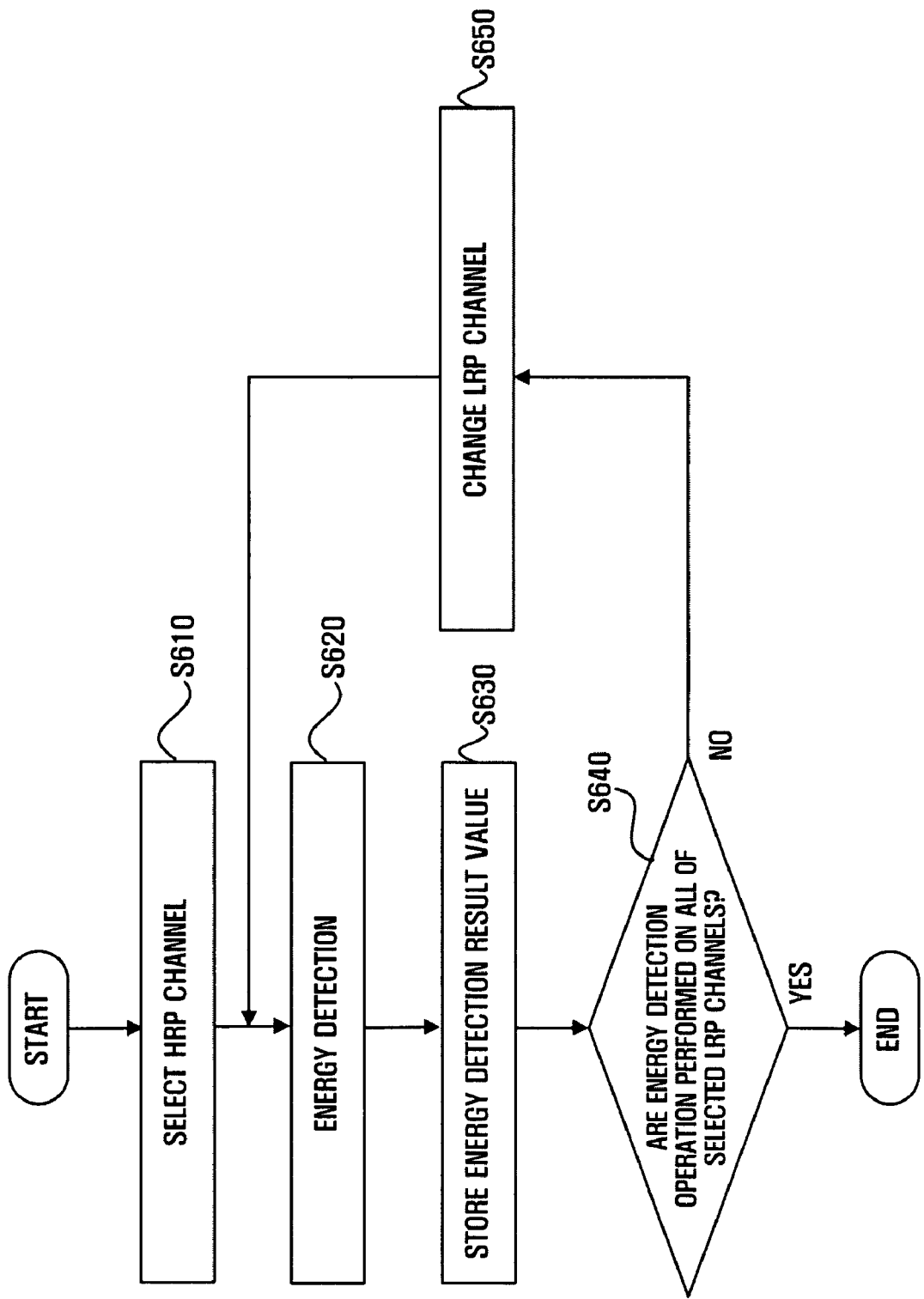
FIG. 6 is a flowchart illustrating a process of scanning an HRP channel according to an exemplary embodiment of the invention.

As such, the coordinator capable device sequentially performs a scanning operation on all of the LRP channels that are applicable by the coordinate capable device. When the scanning operation is completed on all of the LRP channels, a scanning operation is performed on the HRP channels, and a process of scanning the HRP channels is shown in FIG. 6.

When an energy detecting operation is completed on all of the LRP channels, the coordinator capable device selects HRP channels among all of the HRP channels applicable by the coordinator capable device, in which energy detection result values of the corresponding LRP channels are smaller than a first threshold value (STEP S610). For example, as shown in FIG. 7, if assuming that there exist the HRP channels, the LRP channels corresponding to the respective HRP channels, energy detection result values of the respective LRP channels according to the LRP scanning operation, and the first threshold value, the LRP channels that have the energy detection result values smaller than the first threshold value correspond to channels 1A, 1B, 1C, 2A, 2B, 2C, 4A, 4B, and 4C. In this case, it may be understood that a first channel 710 and a fourth channel 720 among all of the LRP channels, whose energy detection result values are smaller than the first threshold value, are HRP channels that may be selected in step S610. In this case, the first threshold value is a reference value for selecting LRP channels in which a communication interference with another wireless network is a certain level or less, or does not occur, and may be set in advance to an appropriate value.

The coordinator capable device performs an energy detecting operation on one HRP channel among the selected HRP channels (STEP S620). The energy detecting operation on the HRP channels may be performed for a second threshold time. Here, the second threshold time may be set in advance to a time suitable for energy detection with respect to the HRP channels. The second threshold time may be equal to or different from the first threshold time that has been described in step S510 of FIG. 5.

When an energy detecting operation is completed on one HRP channel, the coordinator capable device stores a largest energy detection result value of the corresponding HRP channel (STEP S630).

Then, the coordinator capable device determines whether an energy detecting operation is performed on all of the HRP channels selected in step S610 (STEP S640). If there exist HRP channels on which an energy detecting operation is not performed, the coordinator capable device changes the HRP channels to perform an energy detecting operation (STEP S650), and starts to perform an energy detecting operation on the changed HRP channels (STEP S620). However, when an energy detecting operation is completed on all of the HRP channels selected in step S610, a process of scanning the HRP channels is completed.

Figure 8:
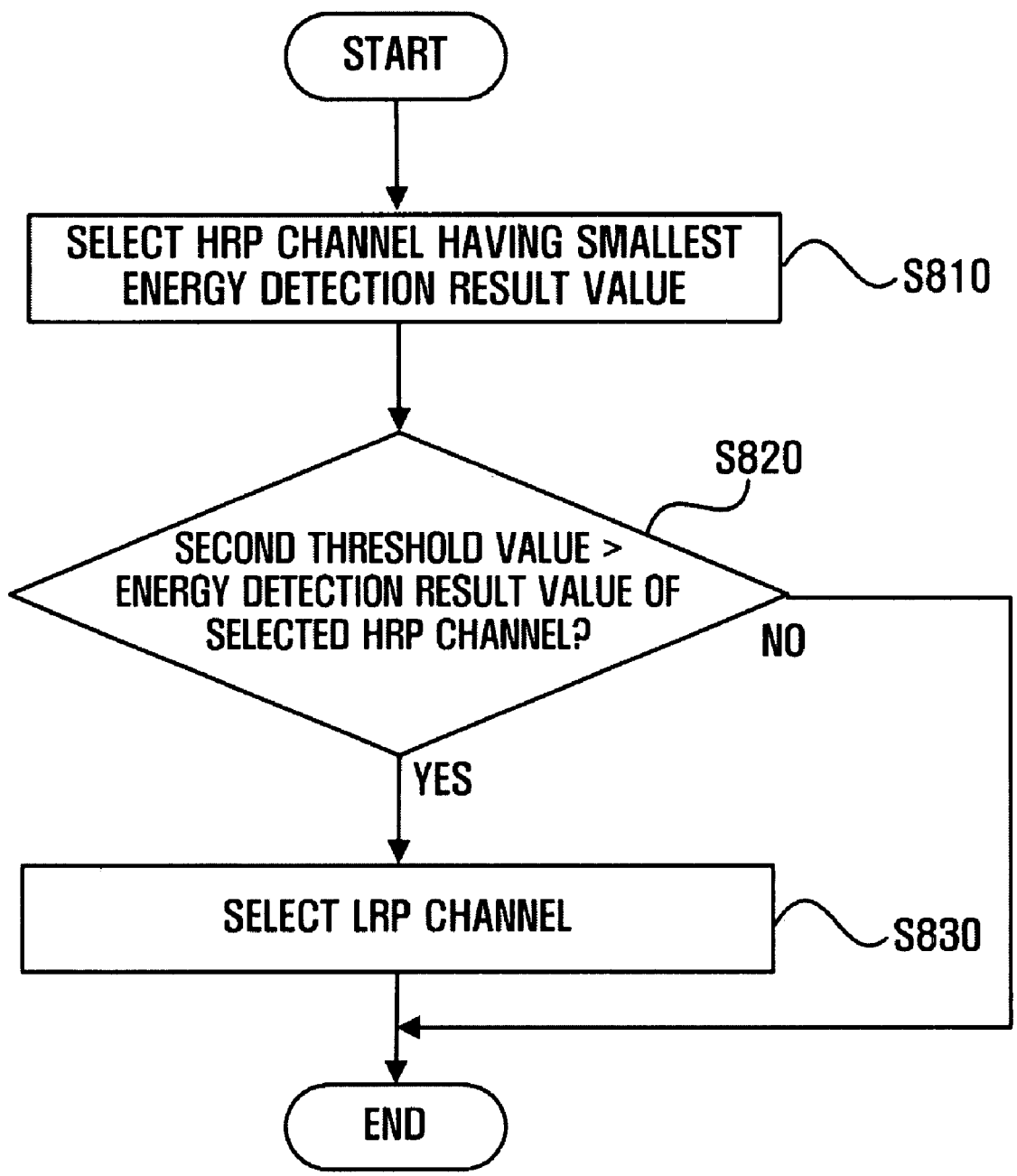
FIG. 8 is a flowchart illustrating a process of selecting a channel according to an exemplary embodiment of the invention.

If a scanning operation is completed on both the LRP channels and the HRP channels, the coordinator capable device selects channels that are necessary for starting a new wireless network according to a result of the scanning operation. A process of selecting channels according to an exemplary embodiment of the invention is shown in FIG. 8.

The coordinator capable device selects an HRP channel among all of the HRP channels on which an energy detecting operation is performed, which has a smallest energy detection result value (STEP S810). Then, the energy capable device determines whether an energy detection result value of the selected HRP channel is smaller than the second threshold value (STEP S820). When the selected HRP channel is used, the second threshold value may be set to an appropriate value by experiments so as to be used as a reference value to determine whether a communication interference with another wireless network is a certain level or less or a new wireless network may be used without communication interference.

If the energy detection result value of the selected HRP channel is not less than the second threshold value (NO in STEP S820), the coordinator capable device completes a channel selecting operation. This case corresponds to a case in which the channel selection fails, and the coordinator capable device does not form a new wireless network until at least one HRP channel is cleared. However, when the energy detection result value of the selected HRP channel is smaller than the second threshold value (YES in STEP S820), the coordinator capable device selects any one of a plurality of LRP channels corresponding to the selected HRP channel (STEP S830). Preferably, the coordinator capable device may select an LRP channel among a plurality of LRP channels corresponding to the selected HRP, which has a smallest energy detection result value. For example, in an exemplary embodiment shown in FIG. 7, when the first channel 710 is selected as the HRP channel, the coordinator capable device may select the channel 1A among the LRP channels 1A, 1B, and 1C corresponding to the channel 1, which has a smallest energy detection result value.

Through the above-described process, when both the HRP channels and the LRP channels are selected, the coordinator capable device drives a new wireless network that uses the selected channel, and transmits or receives necessary data.

In the above description, although it has been described that the device to drive the new wireless network selects the HRP channel and the LRP channel, the invention is not limited thereto. For example, the device may select the HRP channel and the LRP channel to transmit and receive the data. That is, the device that has selected the appropriate channel may transmit and receive the necessary data through the selected channel.

Figure 9:
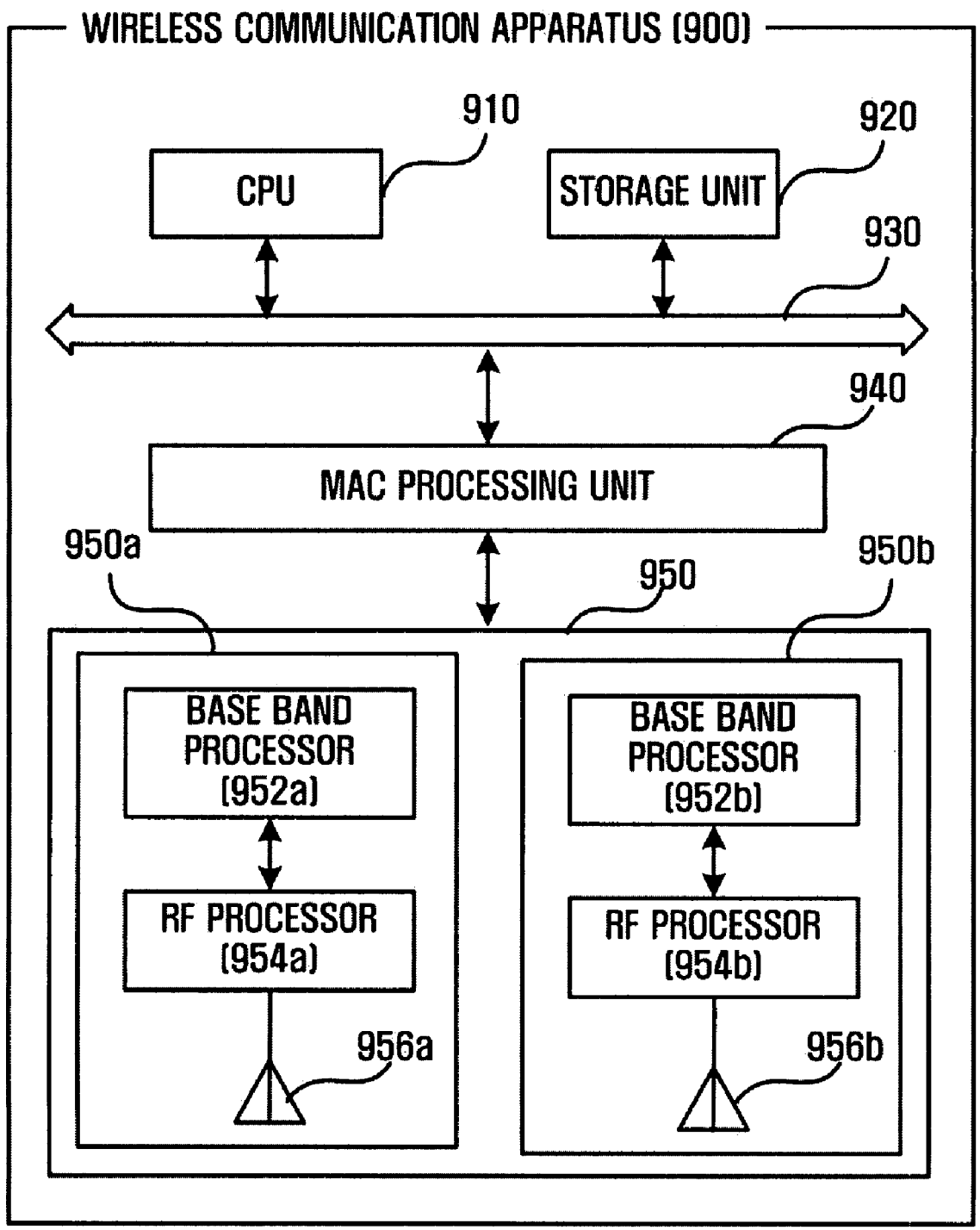
FIG. 9 is a block diagram illustrating a wireless communication apparatus according to an exemplary embodiment of the invention.

FIG. 9 is a block diagram illustrating a wireless communication device according to an exemplary embodiment of the invention. A wireless communication device 900 shown in FIG. 9 corresponds to the above-described coordinator capable device that performs a process of scanning and selecting a channel.

The wireless communication device 900 includes a CPU 910, a storage unit 920, a MAC processing unit 940, and a transceiver 950.

The CPU 910 controls the other constituent elements that are connected to a bus 930, and performs various processes at upper layers (for example, an LCC (Logical Link Control) layer, a network layer, a transmission layer, and an application layer) of a MAC (Media Access Control) among general communication layers. Accordingly, the CPU 910 processes data supplied by the MAC processing unit 940 or generates transmission data and supplies it to the MAC processing unit 940. For example, the data that is generated or processed by the CPU 910 may be uncompressed A/V data.

The storage unit 920 stores the received data processed by the CPU 910 or stores the transmission data generated by the CPU 910. The storage unit 920 may be implemented by nonvolatile memory elements, such as a ROM, a PROM, an EPROM, an EEPROM, and a flash memory, a volatile memory element, such as a RAM, storage media, such as a hard disk and an optical disk, or any other memories known to those skilled in the art.

The MAC processing unit 940 instructs the transceiver 950 to perform a channel scanning operation, and selects necessary channels on the basis of energy detection result values of the respective channels provided by the transceiver 950. For example, the MAC processing unit 940 may detect a channel pair including an HRP channel and an LRP channel that have the smallest interference among all of the HRP channels and the LRP channels that are applicable. If the interference in each of the detected HRP and LRP channels is smaller than a certain threshold value, the MAC processing unit 940 may drive a new wireless network that uses the detected HRP and LRP channels. In order to drive the wireless network, the MAC processing unit 940 generates a beacon including information about a communication timing to provide it to the transceiver 950 to be broadcasted.

The transceiver 950 performs a channel scanning operation according to the instruction of the MAC processing unit 940. The transceiver 950 includes a first physical processing unit 950a and a second physical processing unit 950b. In the transceiver 950, the first physical processing unit 950a is implemented by the LRP, and the second physical processing unit 950b is implemented by the HRP. Accordingly, the first physical processing unit 950a performs a scanning operation on the LRP channel according to the instruction of the MAC processing unit 940, and the second physical processing unit 950b performs a scanning operation on the HRP channel according to the instruction of the MAC processing unit 940. The channel scanning is a process that sequentially measures the sensitivity of the wireless signal with respect to the respective channels for a certain time and records largest energy detection result values of the respective channels. At this time, the first physical processing unit 950a and the second physical processing unit 950b transmit the energy detection result values measured according to channel scanning with respect to the respective channels to the MAC processing unit 940.

Further, the second physical processing unit 950b is divided into a base band processor 952b that processes a base band signal, and an RF (Radio Frequency) processing unit 954b that generates an actual wireless signal from the processed base band signal and transmits the generated wireless signal thorough the air by an antenna 956b.

Specifically, the base band processor 952b performs processes, such as frame formatting, channel coding, and the like, and the RF processing unit 954b performs processes, such as analog wave amplification, analog/digital signal conversion, modulation, and the like. Meanwhile, it is preferable that the antenna 956b be composed of an array antenna to enable beam steering. The array antenna is the type where a plurality of antenna elements are disposed in one line. However, the invention is not limited thereto. For example, the array antenna may have a structure in which a plurality of antenna elements are disposed in a two-dimensional matrix, which achieves more sophisticated beam steering in three dimensions.

The first physical processing unit 950a may be divided into a base band processor 952a that processes a base band signal, and a RF processing unit 954a that generates an actual wireless signal from the processed base band signal and transmits the generated wireless signal through the air by the antenna 956a. The base band processor 952a and the RF processing unit 954a of the first physical processing unit 950a are similar to the base band processor 952b and the RF processing unit 954b of the second physical processing unit 950b in structure and function. However, the first physical processing unit 950a is different from the second physical processing unit 950b in the used communication channel and the type of the transmitted data. Therefore, the base band processors 952a and 952b may use channel coding methods of different types or different channel coding parameters. Further, the RF processing units 954a and 954b may use different modulation methods or different frequency bands.

Figure 10A:
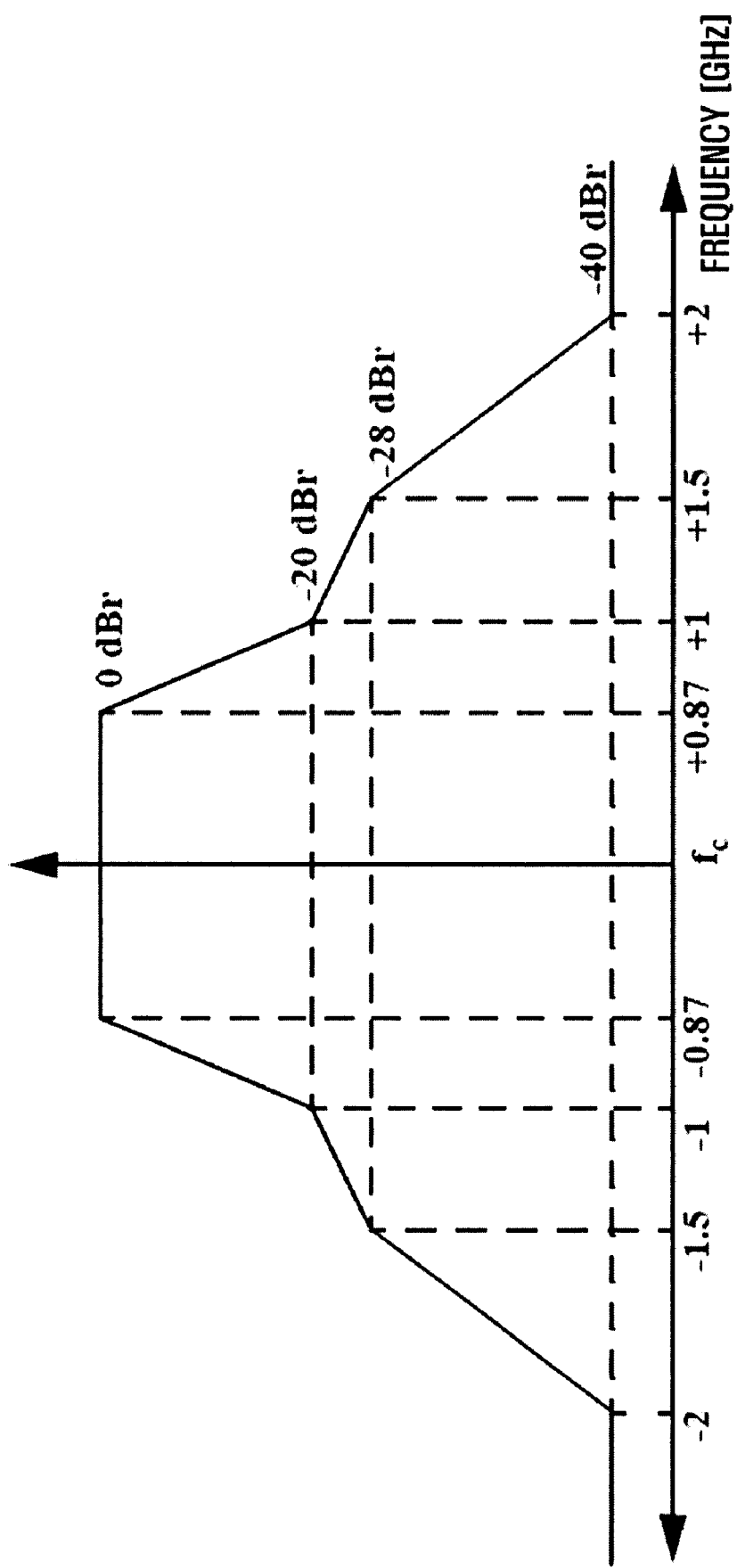
FIG. 10A is a diagram illustrating a transmission spectral mask of an HRP according to an exemplary embodiment of the invention.
Figure 10B:
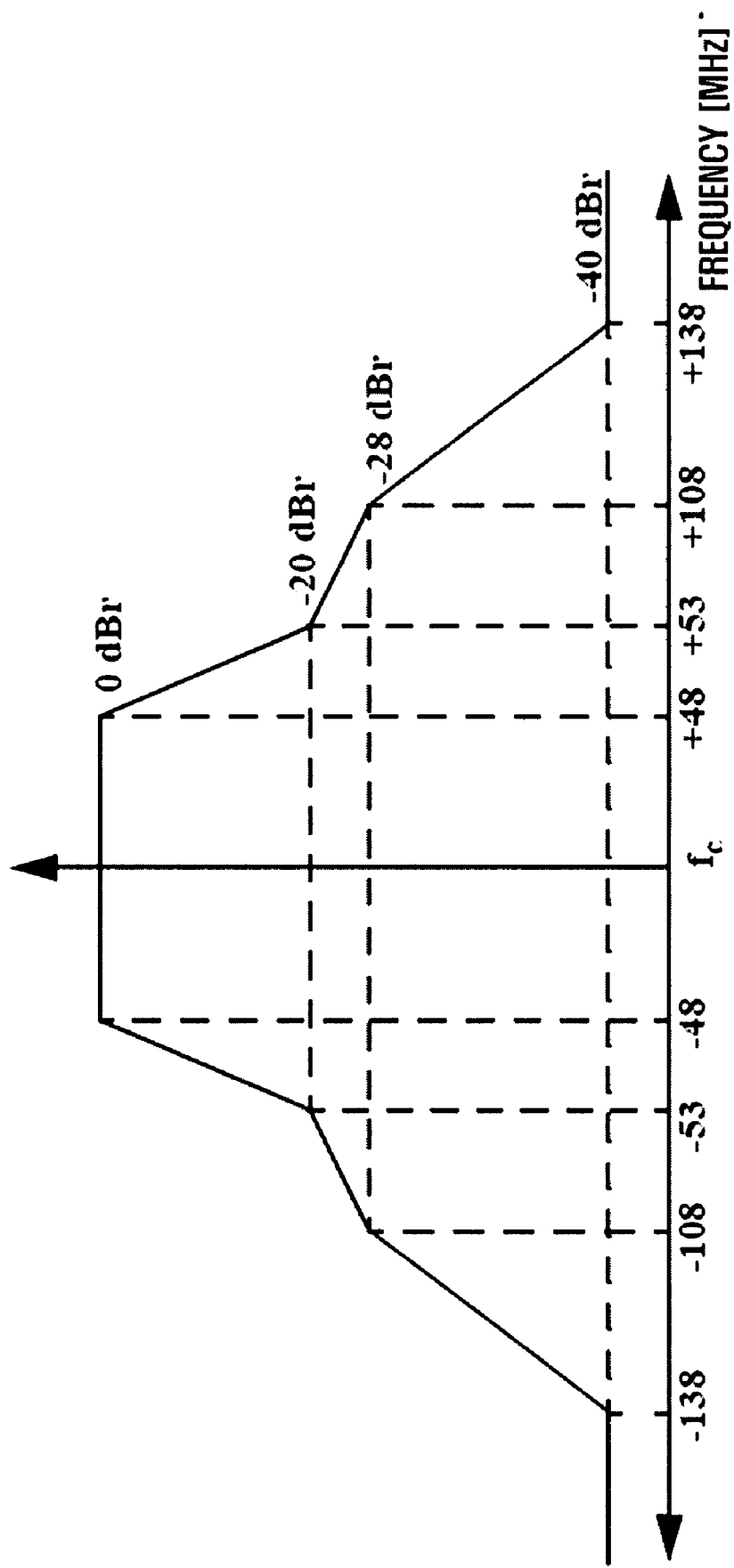
FIG. 10B is a diagram illustrating a transmission spectral mask of an LRP according to an exemplary embodiment of the invention.

One example of the frequency band that may be used by the RF processing unit 954b is shown in Table 1, and one example of the frequency band that may be used by the RF processing unit 954a is shown in Table 2. In regards to that, a transmission spectral mask of the RF processing unit 954b according to the exemplary embodiment of the invention is shown in FIG. 10A, and a transmission spectral mask of the RF processing unit 954a is shown in FIG. 10B.

In the exemplary embodiment of the invention, the functions and the operations of the MAC processing unit 940 for scanning and selecting the HRP channel and the LRP channel and the transceiver 950 may be understood through the process of scanning and selecting the channel that have been described with reference to FIGS. 5 to 8.

The components of the wireless communication apparatus 900 that has been described with reference to FIG. 9 may be implemented by a module. In this case, the term "module" used in the exemplary embodiment of the invention means software, or a hardware component such as an FPGA (Field Programmable Gate Array) or an ASIC (Application Specific Integrated Circuit) and the modules each perform allocated functions.

However, the modules are not limited to software or hardware. The modules may be configured in an addressable storage medium, or may be configured to run on at least one processor. Therefore, as an example, the modules include: components such as software components, aspect-oriented software components, class components, and task components; processors, functions, attributes, procedures, sub-routines, segments of program codes, drivers, firmware, microcodes, circuits, data, databases, data structures, tables, arrays, and variables. The functions provided by the components and the modules may be combined into fewer components and modules or may be separated into additional components and modules.

Meanwhile, those skilled in the art may create a program that may execute the processes that have been described with reference to FIGS. 4 to 8. This program is stored in a storage medium readable by a computer, the storage medium is connected to the computer, exemplary embodiments described in the specification and equivalences of such metes and bounds may be implemented, and this case are also intended to be embraced by the claims.

Although the invention has been described in connection with the exemplary embodiments of the invention with reference to the accompanying drawings, it will be apparent to those skilled in the art that various modifications and changes may be made thereto without departing from the scope and spirit of the invention. Therefore, it should be understood that the above exemplary embodiments are not limitative, but illustrative in all aspects.

According to a method of determining channel to be used in a wireless network, a wireless communication method, and an apparatus for the same according to an exemplary embodiment of the invention, the following effects may be achieved.

First, it is possible to effectively scan and select a plurality of channels whose applicable transmission capabilities are different from one another.

Second, it is possible to provide a wireless network that may use both a high-rate channel and a low-rate channel.

What is claimed is:

1. A wireless communication method using a processor, the method comprising:
   selecting, by the processor, first and second channels that apply different data transmission capabilities, respectively; and
   transmitting and receiving, by the processor, data using the selected first and second channels,
   wherein the selecting of the first and second channels comprises:
   selecting a first channel from among a plurality of first channels; and
   selecting a second channel, which corresponds to the selected first channel, from among a plurality of second channels,
   and wherein a frequency band of the selected first channel comprises respective frequency bands of the plurality of second channels that overlap with parts of the frequency band of the selected first channel.

2. The method of claim 1, wherein the data transmission capabilities are data transmission rates.

3. The method of claim 1, wherein a number of the plurality of second channels is three or more.

4. The method of claim 1, wherein the selecting of the first channel comprises:
   performing an energy detecting operation according to a signal receiving sensitivity with respect to at least one first channel among the plurality of first channels; and
   selecting the first channel having a smallest energy detection result value.

5. The method of claim 4, wherein the performing of the energy detecting operation comprises:
   performing an energy detecting operation according to a signal receiving sensitivity with respect to all applicable second channels; and
   performing an energy detecting operation on at least one first channel among the plurality of first channels, in which an energy detection result value of a corresponding second channel is smaller than a certain threshold value.

6. The method of claim 5, wherein the energy detecting operation on all of the applicable second channels is performed on each of the applicable second channels for a certain time.

7. The method of claim 6, wherein the certain time is longer than a super frame that indicates a communication timing schedule in the wireless network.

8. The method of claim 1, wherein an energy detection result value according to a signal receiving sensitivity in the selected first channel is smaller than a certain threshold value.

9. The method of claim 1, wherein the selected second channel has a smallest energy detection result value according to a signal receiving sensitivity among the plurality of second channels.

10. A method of determining a channel to be used in a wireless network by using a processor, the method comprising:
    scanning, by the processor, a plurality of channels; and
    selecting, by the processor, a plurality of channels that apply different data transmission capabilities according to the scanning result,
    wherein the plurality of channels comprises a plurality of first channels and a plurality of second channels, each of the plurality of first channels corresponds to at least one of the plurality of second channels and a frequency band of each of the plurality of first channels comprises a frequency band of a corresponding second channel among the plurality of second channels that overlap with parts of the frequency band of the selected first channel.

11. The method of claim 10, wherein the data transmission capabilities are data transmission rates.

12. The method of claim 10, wherein the scanning of the plurality of channels comprises:
    performing an energy detecting operation according to a signal receiving sensitivity with respect to the plurality of second channels; and
    performing an energy detecting operation according to a signal receiving sensitivity with respect to at least one first channel among the plurality of first channels.

13. The method of claim 12, wherein the performing of the energy detecting operation according to a signal receiving sensitivity with respect to at least one first channel among the plurality of first channels comprises performing an energy detecting operation on at least one first channel among the plurality of first channels, in which an energy detection result value of a corresponding second channel is smaller than a certain threshold value.

14. The method of claim 12, wherein the selecting of the plurality of channels comprises:
    selecting a first channel having a smallest energy detection result value among the plurality of first channels; and
    selecting a second channel having a smallest energy detection result value among the second channels which corresponds to the selected first channel.

15. The method of claim 14, wherein the energy detection result value of the selected first channel is smaller than a certain threshold value.

16. The method of claim 12, wherein the energy detecting operation on the plurality of second channels is performed on each of the plurality of second channels for a certain time.

17. The method of claim 16, wherein the certain time is longer than a super frame that indicates a communication timing schedule in the wireless network.

18. A wireless communication apparatus, the apparatus comprising:
    a transceiver scanning a plurality of channels; and a MAC processing unit selecting a plurality of channels that apply different data transmission capabilities according to the scanning result, wherein the plurality of channels comprises a plurality of first channels and a plurality of second channels, each of the plurality of first channels corresponds to at least one of the plurality of second channels and a frequency band of each of the plurality of first channels comprises a frequency band of a corresponding second channel among the plurality of second channels that overlap with parts of the frequency band of the selected first channel.

19. The apparatus of claim 18, wherein the data transmission capabilities are data transmission rates.

20. The apparatus of claim 18, wherein the transceiver comprises:
   a first physical processing unit performing an energy detecting operation according to a signal receiving sensitivity with respect to the plurality of second channels; and
   a second physical processing unit performing an energy detecting operation according to a signal receiving sensitivity with respect to at least one first channel among the plurality of first channels.

21. The apparatus of claim 20, wherein the second physical processing unit performs an energy detecting operation on at least one first channel among the plurality of first channels, in which an energy detection result value of a corresponding second channel is smaller than a certain threshold value.

22. The apparatus of claim 20, wherein the MAC processing unit selects a first channel having a smallest energy detection result value among the plurality of first channels, and selects a second channel having a smallest energy detection result value among the second channels which corresponds to the selected first channel.

23. The apparatus of claim 22, wherein the energy detection result value of the selected first channel is smaller than a certain threshold value.

24. The apparatus of claim 20, wherein the energy detecting operation on the plurality of second channels is performed on each of the plurality of second channels for a certain time.

25. The apparatus of claim 24, wherein the certain time is longer than a super frame that indicates a communication timing schedule in the wireless network.

26. The apparatus of claim 18, wherein the MAC processing unit generates a beacon,
   wherein the beacon drives a wireless network that uses the plurality of selected channels.

27. The apparatus of claim 26, wherein the beacon comprises information about communication timing in the wireless network.

28. The apparatus of claim 26, wherein the transceiver transmits the generated beacon through any one of the plurality of selected channels.

29. The apparatus of claim 18, further comprising:
   a transceiver which transmits and receives data using the plurality of selected channels.

30. A non-transitory storage medium storing program instructions readable by a computer that when executed performs a wireless communication method using a processor, the method comprising:
   selecting, by the processor, first and second channels that apply different data transmission capabilities, respectively; and
   transmitting and receiving, by the processor, data using the selected first and second channels,
   wherein the selecting of the first and second channels comprises:
   selecting a first channel from among a plurality of first channels; and
   selecting a second channel, which corresponds to the selected first channel, from among a plurality of second channels,
   and wherein a frequency band of the selected first channel comprises respective frequency bands of the plurality of second channels that overlap with parts of the frequency band of the selected first channel.

31. A non-transitory storage medium storing program instructions readable by a computer that when executed performs a method of determining a channel to be used in a wireless network by using a processor, the method comprising:
   scanning, by the processor, a plurality of channels; and
   selecting, by the processor, a plurality of channels that apply different data transmission capabilities according to the scanning result,
   wherein the plurality of channels comprises a plurality of first channels and a plurality of second channels, each of the plurality of first channels corresponds to at least one of the plurality of second channels and a frequency band of each of the plurality of first channels comprises a frequency band of a corresponding second channel among the plurality of second channels that overlap with parts of the frequency band of the selected first channel.

* * * * *